US008601223B1

(12) United States Patent
Yuan

(10) Patent No.: US 8,601,223 B1
(45) Date of Patent: Dec. 3, 2013

(54) TECHNIQUES FOR SERVICING FETCH REQUESTS UTILIZING COALESING PAGE TABLE ENTRIES

(75) Inventor: Lingfeng Yuan, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 621 days.

(21) Appl. No.: 11/586,826

(22) Filed: Oct. 24, 2006

Related U.S. Application Data

(63) Continuation-in-part of application No. 11/523,950, filed on Sep. 19, 2006.

(51) Int. Cl.
 *G06F 12/00* (2006.01)
(52) U.S. Cl.
 USPC ........... 711/154; 711/170; 711/167; 711/208; 711/156; 711/165; 345/535; 345/543
(58) Field of Classification Search
 USPC ......... 711/154, 167, 208, 209, 170, 156, 165; 345/535, 543
 See application file for complete search history.

(56) References Cited

U.S. PATENT DOCUMENTS

| | | | |
|---|---|---|---|
| 3,815,101 A | 6/1974 | Boss et al. | |
| 3,950,729 A | 4/1976 | Fletcher et al. | |
| 4,654,790 A | 3/1987 | Woffinden | |
| 4,797,814 A | 1/1989 | Brenza | |
| 4,812,981 A | 3/1989 | Chan et al. | |
| 5,123,094 A | 6/1992 | MacDougall | |
| 5,179,669 A | 1/1993 | Peters | |
| 5,245,702 A | 9/1993 | McIntyre et al. | |
| 5,278,962 A * | 1/1994 | Masuda et al. | 711/207 |
| 5,414,824 A | 5/1995 | Grochowski | |
| 5,446,854 A | 8/1995 | Khalidi et al. | |
| 5,526,504 A | 6/1996 | Hsu et al. | |
| 5,649,102 A | 7/1997 | Yamauchi et al. | |
| 5,649,184 A | 7/1997 | Hayashi et al. | |
| 5,696,925 A | 12/1997 | Koh | |
| 5,949,785 A | 9/1999 | Beasley | |
| 5,963,984 A | 10/1999 | Garibay, Jr. et al. | |
| 5,999,189 A | 12/1999 | Kajiya et al. | |
| 6,012,132 A | 1/2000 | Yamada et al. | |
| 6,298,390 B1 | 10/2001 | Matena et al. | |
| 6,362,826 B1 * | 3/2002 | Doyle et al. | 345/532 |
| 6,457,115 B1 | 9/2002 | McGrath | |
| 6,470,428 B1 | 10/2002 | Milway et al. | |
| 6,499,090 B1 | 12/2002 | Hill et al. | |
| 6,549,997 B2 | 4/2003 | Kalyanasundharam | |
| 6,636,223 B1 | 10/2003 | Morein | |
| 6,658,538 B2 | 12/2003 | Arimilli et al. | |
| 6,742,104 B2 | 5/2004 | Chauvel et al. | |
| 6,813,699 B1 | 11/2004 | Belgard | |
| 6,823,433 B1 | 11/2004 | Barnes et al. | |
| 6,839,813 B2 | 1/2005 | Chauvel | |

(Continued)

FOREIGN PATENT DOCUMENTS

| | | |
|---|---|---|
| JP | 02288927 | 11/1990 |
| JP | 2288927 | 11/1990 |

(Continued)

OTHER PUBLICATIONS

Osronline, (The Basics: So what is a page fault?) May 3, p. 1-2.

(Continued)

*Primary Examiner* — Stephen C Elmore
*Assistant Examiner* — Mark A Giardino, Jr.

(57) ABSTRACT

A memory access technique, in accordance with one embodiment of the present invention, includes coalescing mappings between virtual memory and physical memory when a contiguous plurality of virtual pages map to a contiguous plurality of physical pages. Any of the coalesced page table entries are sufficient to map all pages within the coalesced region. Accordingly, a memory subsystem can redirect one or more pending page table entry fetch requests to an appropriate coalesced page table entry.

18 Claims, 11 Drawing Sheets

(56) References Cited

U.S. PATENT DOCUMENTS

| | | | |
|---|---|---|---|
| 6,859,208 | B1 | 2/2005 | White |
| 6,877,077 | B2* | 4/2005 | McGee et al. ............... 711/158 |
| 6,883,079 | B1 | 4/2005 | Priborsky |
| 7,007,075 | B1 | 2/2006 | Coffey |
| 7,082,508 | B2 | 7/2006 | Khan et al. |
| 7,107,411 | B2 | 9/2006 | Burton et al. |
| 7,107,441 | B2 | 9/2006 | Zimmer et al. |
| 7,120,715 | B2 | 10/2006 | Chauvel et al. |
| 7,159,095 | B2 | 1/2007 | Dale et al. |
| 7,194,597 | B2 | 3/2007 | Willis et al. |
| 7,234,038 | B1 | 6/2007 | Durrant |
| 7,275,246 | B1 | 9/2007 | Yates, Jr. et al. |
| 7,401,358 | B1 | 7/2008 | Christie et al. |
| 7,447,869 | B2 | 11/2008 | Kruger et al. |
| 7,519,781 | B1 | 4/2009 | Wilt |
| 7,545,382 | B1 | 6/2009 | Montrym et al. |
| 2002/0004823 | A1 | 1/2002 | Anderson et al. |
| 2002/0013889 | A1 | 1/2002 | Schuster et al. |
| 2002/0169938 | A1 | 11/2002 | Scott et al. |
| 2002/0172199 | A1 | 11/2002 | Scott et al. |
| 2003/0014609 | A1 | 1/2003 | Kissell |
| 2003/0167420 | A1 | 9/2003 | Parsons |
| 2003/0196066 | A1 | 10/2003 | Mathews |
| 2003/0236771 | A1* | 12/2003 | Becker ............................ 707/2 |
| 2004/0025161 | A1 | 2/2004 | Chauvel et al. |
| 2004/0054833 | A1 | 3/2004 | Seal et al. |
| 2004/0078778 | A1 | 4/2004 | Leymann et al. |
| 2004/0153350 | A1 | 8/2004 | Kim et al. |
| 2004/0193831 | A1 | 9/2004 | Moyer |
| 2004/0215918 | A1* | 10/2004 | Jacobs et al. ................ 711/207 |
| 2004/0268071 | A1 | 12/2004 | Khan et al. |
| 2005/0050013 | A1 | 3/2005 | Ferlitsch |
| 2005/0097280 | A1 | 5/2005 | Hofstee et al. |
| 2005/0268067 | A1 | 12/2005 | Lee et al. |
| 2006/0004984 | A1 | 1/2006 | Morris et al. |
| 2006/0069879 | A1 | 3/2006 | Inoue et al. |
| 2006/0069899 | A1 | 3/2006 | Schoinas et al. |
| 2006/0187945 | A1 | 8/2006 | Andersen |
| 2006/0195683 | A1 | 8/2006 | Kissell |
| 2006/0230223 | A1* | 10/2006 | Kruger et al. .................... 711/6 |
| 2006/0259732 | A1 | 11/2006 | Traut et al. |
| 2006/0259825 | A1 | 11/2006 | Cruickshank et al. |
| 2006/0282645 | A1 | 12/2006 | Tsien |
| 2006/0288174 | A1 | 12/2006 | Nace et al. |
| 2007/0067505 | A1 | 3/2007 | Kaniyur et al. |
| 2007/0073996 | A1 | 3/2007 | Kruger et al. |
| 2007/0106874 | A1 | 5/2007 | Pan et al. |
| 2007/0126756 | A1 | 6/2007 | Glasco et al. |
| 2007/0157001 | A1 | 7/2007 | Ritzau |
| 2007/0168634 | A1 | 7/2007 | Morishita et al. |
| 2007/0168643 | A1 | 7/2007 | Hummel et al. |
| 2008/0263284 | A1 | 10/2008 | da Silva et al. |

FOREIGN PATENT DOCUMENTS

| | | |
|---|---|---|
| JP | 0305466 | 1/1991 |
| JP | 3005466 | 1/1991 |
| JP | 3054660 | 3/1991 |
| JP | 4182858 | 5/1992 |
| JP | 04182858 | 6/1992 |

OTHER PUBLICATIONS

Chaudhuri, "The impact of NACKs in shared memory scientific applications", Feb. 2004, IEEE, IEEE Transactions on Parallel and distributed systems vol. 15, No. 2, p. 134-150.

Laibinis, "Formal Development of Reactive Fault Tolerant Systems", Sep. 9, 2005, Springer, Second International Workshop, RISE 2005, p. 234-249 (NVID-1957).

Wikipedia, Memory Address, Oct. 29, 2010, pp. 1-4, www.wikipedia.com.

Wikipedia, Physical Address, Apr. 17, 2010, pp. 1-2, www.wikipedia.com.

Notice of Allowance Mailed Oct. 16, 2009; James M. Van Dyke, Austin, TX (US); U.S. Appl. No. 11/592,819.

Non-Final Office Action Mailed Mar. 17, 2010; James M. Van Dyke, Austin, TX (US); U.S. Appl. No. 11/592,819.

Notice of Allowance Mailed Nov. 23, 2010; James M. Van Dyke, Austin, TX (US); U.S. Appl. No. 11/592,819.

Notice of Allowance Mailed Apr. 19, 2011; James M. Van Dyke, Austin, TX (US); U.S. Appl. No. 11/592,819.

Notice of Allowance Mailed Sep. 7, 2011; James M. Van Dyke, Austin, TX (US); U.S. Appl.No. 11/592,819.

Non-Final Office Action Mailed May 27, 2010; David B. Glasco, Austin, TX (US); U.S. Appl. No. 11/591,629.

Non-Final Office Action Mailed Nov. 3, 2010; David B. Glasco, Austin, TX (US); U.S. Appl. No. 11/591,629.

Final Office Action Mailed Jun. 8, 2011; David B. Glasco, Austin, TX (US); U.S. Appl. No. 11/591,629.

Non-Final Office Action Mailed Apr. 28, 2010; David B. Glasco, Austin, TX (US); U.S. Appl. No. 11/592,780.

Non-Final Office Action Mailed Oct. 13, 2010; David B. Glasco, Austin, TX (US); U.S. Appl. No. 11/592,780.

Final Office Action Mailed Apr. 12, 2011; David B. Glasco, Austin, TX (US); U.S. Appl. No. 11/592,780.

Final Office Action Mailed Apr. 27, 2010; David B. Glasco, Austin, TX (US); U.S. Appl. No. 11/588,177.

Non-Final Office Action Mailed Jun. 7, 2011; David B. Glasco, Austin, TX (US); U.S. Appl. No. 11/588,177.

Non-Final Office Action Mailed Apr. 27, 2010; Lingfeng Yuan, Palo Alto, CA (US); U.S. Appl. No. 11/591,856.

Notice of Allowance Mailed Nov. 12, 2010; Lingfeng Yuan, Palo Alto, CA (US); U.S. Appl. No. 11/591,856.

Notice of Allowance Mailed Mar. 9, 2011; Lingfeng Yuan, Palo Alto, CA (US); U.S. Appl. No. 11/591,856.

Notice of Allowance Mailed Jun. 17, 2011; Lingfeng Yuan, Palo Alto, CA (US); U.S. Appl. No. 11/591,856.

Non-Final Office Action Mailed Feb. 22, 2010; David B. Glasco, Austin, TX (US); U.S. Appl. No. 11/586,825; Publication No. US 2007-0126756 A1; Publication Date: Jun. 7, 2007.

Notice of Allowance Mailed Aug. 16, 2010; David B. Glasco, Austin, TX (US); U.S. Appl. No. 11/586,825; Publication No. US 2007-0126756 A1; Publication Date: Jun. 7, 2007.

Notice of Allowance Mailed Nov. 26, 2010; David B. Glasco, Austin, TX (US); U.S. Appl. No. 11/586,825; Publication No. US 2007-0126756 A1; Publication Date: Jun. 7, 2007.

Notice of Allowance Mailed Mar. 4, 2011; David B. Glasco, Austin, TX (US); U.S. Appl. No. 11/586,825; Publication No. US 2007-0126756 A1; Publication Date: Jun. 7, 2007.

Notice of Allowance Mailed Jun. 16, 2011; David B. Glasco, Austin, TX (US); U.S. Appl. No. 11/586,825; Publication No. US 2007-0126756 A1; Publication Date: Jun. 7, 2007.

Notice of Allowance Mailed Aug. 9, 2011; David B. Glasco, Austin, TX (US); U.S. Appl. No. 11/586,825; Publication No. US 2007-0126756 A1; Publication Date: Jun. 7, 2007.

Non-Final Office Action, Mailed May 11, 2010; David B. Glasco, Austin, TX (US); U.S. Appl. No. 11/591,685.

Final Office Action, Mailed 20-27-2010; David B. Glasco, Austin, TX (US); U.S. Appl. No. 11/591,685.

Non-Final Office Action, Mailed May 6, 2011; David B. Glasco, Austin, TX (US); U.S. Appl. No. 11/591,685.

Notice of Restriction, Mailed Apr. 28, 2009; David B. Glasco, Austin, TX (US); U.S. Appl. No. 11/592,076.

Notice of Allowance, Mailed Jan. 29, 2010; David B. Glasco, Austin, TX (US); U.S. Appl. No. 11/592,076.

Notice of Allowance, Mailed May 4, 2010; David B. Glasco, Austin, TX (US); U.S. Appl. No. 11/592,076.

Notice of Allowance, Mailed Aug. 13, 2010; David B. Glasco, Austin, TX (US); U.S. Appl. No. 11/592,076.

Notice of Allowance, Mailed Nov. 26, 2010; David B. Glasco, Austin, TX (US); U.S. Appl. No. 11/592,076.

Notice of Allowance, Mailed Mar. 17, 2011; David B. Glasco, Austin, TX (US); U.S. Appl. No. 11/592,076.

Notice of Allowance, Mailed Jun. 29, 2011; David B. Glasco, Austin, TX (US); U.S. Appl. No. 11/592,076.

(56) References Cited

OTHER PUBLICATIONS

Notice of Restriction, Mailed Aug. 10, 2010; David B. Glasco, Austin, TX (US); U.S. Appl. No. 12/650,068; Publication No. US 2010-0106921 A1; Publication Date: Apr. 29, 2010.
Non-Final Office Action, Mailed Feb. 1, 2011; David B. Glasco, Austin, TX (US); U.S. Appl. No. 12/650,068; Publication No. US 2010-0106921 A1; Publication Date: Apr. 29, 2010.
Final Office Action, Mailed Aug. 9, 2011; David B. Glasco, Austin, TX (US); U.S. Appl. No. 12/650,068; Publication No. US 2010-0106921 A1; Publication Date: Apr. 29, 2010.
Final Office Action, Mailed Mar. 16, 2010; David B. Glasco, Austin, TX (US); U.S. Appl. No. 11/523,830.
Notice of Allowance, Mailed Jun. 28, 2010; David B. Glasco, Austin, TX (US); U.S. Appl. No. 11/523,830.
Notice of Allowance, Mailed Sep. 2, 2010; David B. Glasco, Austin, TX (US); U.S. Appl. No. 11/523,830.
Notice of Allowance, Mailed Jan. 20, 2011; David B. Glasco, Austin, TX (US); U.S. Appl. No. 11/523,830.
Notice of Allowance, Mailed May 5, 2011; David B. Glasco, Austin, TX (US); U.S. Appl. No. 11/523,830.
Notice of Allowance, Mailed Jul. 21, 2011; David B. Glasco, Austin, TX (US); U.S. Appl. No. 11/523,830.
Final Office Action, Mailed Aug. 3, 2010; David B. Glasco, Austin, TX (US); U.S. Appl. No. 11/586,756.
Notice of Allowance, Mailed Dec. 27, 2010; David B. Glasco, Austin, TX (US); U.S. Appl. No. 11/586,756.
Notice of Allowance, Mailed May 12, 2011; David B. Glasco, Austin, TX (US); U.S. Appl. No. 11/586,756.
Notice of Allowance, Mailed Aug. 25, 2011; David B. Glasco, Austin, TX (US); U.S. Appl. No. 11/586,756.
Notice of Restriction, Mailed Apr. 27, 2009; David B. Glasco, Austin, TX (US); U.S. Appl. No. 11/591,857.
Final Office Action, Mailed May 4, 2010; David B. Glasco, Austin, TX (US); U.S. Appl. No. 11/591,857.
Non-Final Office Action, Mailed Dec. 7, 2010; David B. Glasco, Austin, TX (US); U.S. Appl. No. 11/591,857.
Notice of Allowance, Mailed Mar. 18, 2011; David B. Glasco, Austin, TX (US); U.S. Appl. No. 11/591,857.
Notice of Allowance, Mailed Jul. 21, 2011; David B. Glasco, Austin, TX (US); U.S. Appl. No. 11/591,857.
Final Office Action, Mailed Jun. 25, 2010, David B. Glasco, Austin, TX (US); U.S. Appl. No. 11/592,106.
Non-Final Office Action, Mailed Dec. 16, 2010, David B. Glasco, Austin, TX (US); U.S. Appl. No. 11/592,106.
Final Office Action, Mailed Jul. 5, 2011, David B. Glasco, Austin, TX (US); U.S. Appl. No. 11/592,106.
Non-Final Office Action, Mailed Sep. 15, 2008, U.S. Appl. No. 11/523,926.
Final Office Action, Mailed Apr. 10, 2009, U.S. Appl. No. 11/523,926.
Non-Final Office Action, Mailed Oct. 1, 2009, David B. Glasco, Austin, TX (US); U.S. Appl. No. 11/523,926.
Notice of Allowance, Mailed Mar. 29, 2010, David B. Glasco, Austin, TX (US); U.S. Appl. No. 11/523,926.
Notice of Allowance, Mailed Jul. 9, 2010, David B. Glasco, Austin, TX (US); U.S. Appl. No. 11/523,926.
Notice of Allowance, Mailed Oct. 27, 2010, David B. Glasco, Austin, TX (US); U.S. Appl. No. 11/523,926.
Notice of Allowance, Mailed Feb. 3, 2011, David B. Glasco, Austin, TX (US); U.S. Appl. No. 11/523,926.
Notice of Allowance, Mailed May 23, 2011, David B. Glasco, Austin, TX (US); U.S. Appl. No. 11/523,926.
Notice of Allowance, Mailed Aug. 23, 2011, David B. Glasco, Austin, TX (US); U.S. Appl. No. 11/523,926.
Notice of Allowance, Mailed Jul. 21, 2010, David B. Glasco, Austin, TX (US); U.S. Appl. No. 11/523,950.
Notice of Allowance, Mailed Nov. 3, 2010, David B. Glasco, Austin, TX (US); U.S. Appl. No. 11/523,950.
Notice of Allowance, Mailed Jun. 9, 2011, David B. Glasco, Austin, TX (US); U.S. Appl. No. 11/523,950.
Notice of Allowance, Mailed Aug. 30, 2011, David B. Glasco, Austin, TX (US); U.S. Appl. No. 11/523,950.
Wikipedia, (CPU Cache definition), Wikipedia, Jan. 26, 2010, pp. 1-16.
Wikipedia, (Page Fault definition), Wikipedia, Mar. 9, 2009, pp. 1-4.
Glasco et al., Notice of Allowance Dated Sep. 26, 2012; U.S. Appl. No. 11/591,685.
Glasco et al., Notice of Allowance Dated Jan. 14, 2013; U.S. Appl. No. 11/591,685.
Glasco et al., Notice of Allowance Dated Aug. 16, 2012; U.S. Appl. No. 11/592,076.
Glasco et al., Notice of Allowance Dated Sep. 17, 2012; U.S. Appl. No. 12/650,068.
Glasco et al., Notice of Allowance Dated Aug. 29, 2012; U.S. Appl. No. 11/523,830.
Glasco et al., Notice of Allowance Dated Nov. 20, 2012; U.S. Appl. No. 11/586,756.
Glasco et al., Notice of Allowance Dated Sep. 18, 2012; U.S. Appl. No. 11/591,857.
Glasco et al., Notice of Allowance Dated Dec. 31, 2012; U.S. Appl. No. 11/591,857.
Glasco et al., Office Action Dated Jan. 3, 2013; U.S. Appl. No. 11/592,106.
Glasco et al., Notice of Allowance Dated Sep. 12, 2012; U.S. Appl. No. 11/523,926.
Van Dyke et al., Notice of Allowance Dated Oct. 5, 2012; U.S. Appl. No. 11/592,819.
Glasco et al., Office Action Dated Sep. 14, 2012; U.S. Appl. No. 11/591,629.
Glasco et al., Notice of Allowance Dated Sep. 14, 2012; U.S. Appl. No. 11/588,177.
Yuan, Notice of Allowance Dated Sep. 17, 2012; U.S. Appl. No. 11/591,856.
Yuan, Notice of Allowance Dated Jan. 17, 2013; U.S. Appl. No. 11/591,856.
Glasco et al., Notice of Allowance Dated Oct. 12, 2012; U.S. Appl. No. 11/586,825.
Guelfi et al., (Rapid Integration of Software Engineering Techniques) 2005, Second International Workshop, 9 pages.
Harper et al., (Rapid recovery from transient Faults in the fault tolerant processor with fault-tolerant shared memory) 1990, IEEE, p. 350-359.
Ooi, (Fault Tolerant Architecture in a cache memory control LSI), 1992, IEEE, 507-514.
Final Office Action, Mailed Nov. 29, 2011; David B. Glasco, Austin, TX (US); U.S. Appl. No. 11/588,177.
PCMAG (Definition of: Page fault) www.PCMag.com, 1 Page; Mar. 2009.
Shalan. (Dynamic Memory Management for embedded real-time multiprocessor system on a chip), 2000, ACM. 180-186.
Final Office Action, Mailed May 7, 2012; David B. Glasco, Austin, TX (US), U.S. Appl. No. 11/592,780.
Final Office Action, Mailed Nov. 16, 2011; David B. Glasco, Austin, TX (US); U.S. Appl. No. 11/591,685.
Notice of Allowance, Mailed Feb. 22, 2012; David B. Glasco, Austin, TX (US), U.S. Appl. No. 11/591,685.
Notice of Allowance, Mailed May 30, 2012; David B. Glasco, Austin, TX (US), U.S. Appl. No. 11/591,685.
Notice of Allowance, Mailed Oct. 14, 2011; David B. Glasco, Austin, TX (US); U.S. Appl. No. 11/592,076.
Notice of Allowance, Mailed Jan. 27, 2012; David B. Glasco, Austin, TX (US); U.S. Appl. No. 11/592,076.
Notice of Allowance, Mailed May 10, 2012; David B. Glasco, Austin, TX (US); U.S. Appl. No. 11/592,076.
Non-Final Office Action, Mailed Nov. 16, 2011; David B. Glasco, Austin, TX (US); U.S. Appl. No. 12/650,068; Publication No. US 2010-0106921 A1; Publication Date: Apr. 29, 2010.
Notice of Allowance, Mailed May 1, 2012; David B. Glasco, Austin, TX (US); U.S. Appl. No. 12/650,068; Publication No. US 2010-0106921 A1; Publication Date: Apr. 29, 2010.
Notice of Allowance, Mailed Jul. 6, 2012; David B. Glasco, Austin, TX (US); U.S. Appl. No. 12/650,068; Publication No. US 2010-0106921 A1; Publication Date: Apr. 29, 2010.

(56) References Cited

OTHER PUBLICATIONS

Notice of Allowance, Mailed Oct. 26, 2011; David B. Glasco, Austin, TX (US); U.S. Appl. No. 11/523,830.
Notice of Allowance, Mailed Feb. 2, 2012; David B. Glasco, Austin, TX (US); U.S. Appl. No. 11/523,830.
Notice of Allowance, Mailed May 10, 2012; David B. Glasco, Austin, TX (US); U.S. Appl. No. 11/523,830.
Notice of Allowance, Mailed Jan. 13, 2012; David B. Glasco, Austin, TX (US); U.S. Appl. No. 11/586,75.
Notice of Allowance, Mailed May 15, 2012; David B. Glasco, Austin, TX (US); U.S. Appl. No. 11/586,756.
Notice of Allowance, Mailed Oct. 28, 2011; David B. Glasco, Austin, TX (US); U.S. Appl. No. 11/591,857.
Notice of Allowance, Mailed Feb. 10, 2012; David B. Glasco, Austin, TX (US); U.S. Appl. No. 11/591,857.
Notice of Allowance, Mailed May 25, 2012; David B. Glasco, Austin, TX (US); U.S. Appl. No. 11/591,857.
Non-Final Office Action, Mailed Dec. 2, 2011; David B. Glasco, Austin, TX (US); U.S. Appl. No. 11/592,106.
Final Office Action, Mailed May 10, 2012; David B. Glasco, Austin, TX (US); U.S. Appl. No. 11/592,106.
Notice of Allowance, Mailed Oct. 28, 2011; David B. Glasco, Austin, TX (US); U.S. Appl. No. 11/593,926.
Notice of Allowance, Mailed Feb. 24, 2012; David B. Glasco, Austin, TX (US); U.S. Appl. No. 11/523,926.
Notice of Allowance, Mailed Jun. 1, 2012; David B. Glasco, Austin, TX (US); U.S. Appl. No. 11/523,926.
Notice of Allowance, Mailed Nov. 14, 2011; David B. Glasco, Austin, TX (US); U.S. Appl. No. 11/523,950.
Notice of Allowance, Mailed Dec. 9, 2011; James M. Van Dyke, Austin, TX (US); U.S. Appl. No. 11/592,819.
Notice of Allowance, Mailed Jun. 7, 2012; James M. Van Dyke, Austin, TX (US); U.S. Appl. No. 11/592,819.
Non-Final Office Action, Mailed Nov. 1, 2011; David B. Glasco, Austin, TX (US); U.S. Appl. No. 11/592,780.
Notice of Allowance, Mailed Sep. 26, 2011; Lingfeng Yuan, Palo Alto, CA (US); U.S. Appl. No. 11/591,856.
Notice of Allowance, Mailed Jan. 5, 2012; Lingfeng Yuan, Palo Alto, CA (US); U.S. Appl. No. 11/591,856.
Notice of Allowance, Mailed Apr. 12, 2012; Lingfeng Yuan, Palo Alto, CA (US); U.S. Appl. No. 11/591,856.
Notice of Allowance, Mailed Jun. 7, 2012; Lingfeng Yuan, Palo Alto, CA (US); U.S. Appl. No. 11/591,856.
Notice of Allowance, Mailed Dec. 8, 2011; David B. Glasco, Austin, TX (US); U.S. Appl. No. 11/586,825; Publication No. US 2007-0126756 A1; Publication Date: Jun. 7, 2007.
Notice of Allowance, Mailed Mar. 21, 2012; David B. Glasco, Austin, TX (US); U.S. Appl. No. 11/586,825; Publication No. US 2007-0126756 A1; Publication Date: Jun. 7, 2007.
Notice of Allowance, Mailed Jul. 6, 2012; David B. Glasco, Austin, TX (US); U.S. Appl. No. 11/586,825; Publication No. US 2007-0126756 A1; Publication Date: Jun. 7, 2007.
Oracle, (Oracle 8i Parallel server), 1999, Oracle, Release 2 (8.1.6) 1-216.
Shalan. (Dynamic Memory Management for embedded real-time multiprocessor system on a chip), 2003, Georgia Inst. Of Tech. 1-118.
Glasco, et al. Office Action dated Apr. 27, 2009, U.S Appl. No. 11/591,685; All Pages.
Glasco, et al. Office Action dated Nov. 20, 2009, U.S. Appl. No. 11/591,685; All Pages.
Glasco, et al. Office Action dated Aug. 19, 2009, U.S. Appl. No. 11/592,076; All Pages.
Glasco, et al. Notice of Allwance dated Jan. 28, 2013, U.S. Appl. No. 12/650,068; All Pages.
Glasco, et al. Office Action dated Sep. 15, 2008, U.S. Appl. No. 11/523,830; All Pages.
Glasco, et al. Office Action dated May 28, 2009, U.S. Appl. No. 11/523,830; All Pages.
Glasco, et al. Office Action dated Nov. 18, 2008, U.S. Appl. No. 11/586,756; All Pages.
Glasco, et al. Office Action dated Jan. 20, 2010, U.S. Appl. No. 11/586,756; All Pages.
Glasco, et al. Notice of Allowance dated Feb. 20, 2013, U.S. Appl. No. 11/586,756; All Pages.
Glasco, et al. Office Action dated Aug. 19, 2009, U.S. Appl. No. 11/591,857; All Pages.
Glasco, et al. Notice of Allowance dated Feb. 1, 2013, U.S. Appl. No. 11/591,857; All Pages.
Glasco, et al. Office Action dated Apr. 1, 2009, U.S. Appl. No. 11/592,106; All Pages.
Glasco, et al. Office Action dated Nov. 23, 2009, U.S. Appl. No. 11/592,106; All Pages.
Glasco, et al. Office Action dated Oct. 29, 2008, U.S. Appl. No. 11/523,950; All Pages.
Glasco, et al. Notice of Allowance dated Apr. 24, 2009, U.S. Appl. No. 11/523,950; All Pages.
Glasco, et al. Notice of Allowance dated Sep. 3, 2009, U.S. Appl. No. 11/523,950; All Pages.
Glasco, et al. Notice of Allowance dated Dec. 24, 2009, U.S. Appl. No. 11/523,950; All Pages.
Glasco, et al. Notice of Allowance dated Apr. 2, 2013, U.S. Appl. No. 11/523,950; All Pages.
Van Dyke, et al. Office Action dated Feb. 17, 2009, U.S. Appl. No. 11/592,819; All Pages.
Van Dyke, et al. Notice of Allowance dated Jan. 24, 2013, U.S. Appl. No. 11/592,819; All Pages.
Glasco, et al. Office Action dated Feb. 20, 2009, U.S. Appl. No. 11/591,629; All Pages.
Glasco, et al. Final Office Action dated Nov. 9, 2009, U.S. Appl. No. 11/591,629; All Pages.
Glasco, et al. Notice of Allowance dated Mar. 7, 2013, U.S. Appl. No. 11/591,629; All Pages.
Glasco, et al. Office Action dated Apr. 2, 2009, U.S. Appl. No. 11/592,780; All Pages.
Glasco, et al. Final Office Action dated Nov. 24, 2009 U.S. Appl. No. 11/592,780; All Pages.
Glasco, et al. Office Action dated Nov. 13, 2008, U.S. Appl. No. 11/588,177; All Pages.
Glasco, et al. Office Action dated May 21, 2009, U.S. Appl. No. 11/588,177; All Pages.
Glasco, et al. Office Action dated Sep. 24, 2009, U.S. Appl. No. 11/588,177; All Pages.
Glasco, et al. Notice of Allowance dated Mar. 18, 2013, U.S. Appl. No. 11/588,177; All Pages.
Yuan, Office Action dated May 11, 2009, U.S. Appl. No. 11/591,856; All Pages.
Yuan, Final Office Action dated Dec. 8, 2009, U.S. Appl. No. 11/591,856; All Pages.
Glasco, et al. Office Action dated Mar. 18, 2009, U.S. Appl. No. 11/586,825; All Pages.
Glasco, et al. Final Office Action dated Oct. 14, 2009, U.S. Appl. No. 11/586,825; All Pages.
Glasco, et al. Notice of Allowance dated May 8, 2013, U.S. Appl. No. 11/591,685; All Pages.
Glasco, et al. Notice of Allowance dated May 10, 2013, U.S. Appl. No. 12/650,068; All Pages.
Glasco, et al. Final Office Action dated Jun. 4, 2009, U.S. Appl. No. 11/586,756; All Pages.
Glasco, et al. Notice of Allowance dated May 23, 2013, U.S. Appl. No. 11/591,857; All Pages.
Glasco, et al. Final Office Action dated Jun. 6, 2013, U.S. Appl. No. 11/592,106; All Pages.
Glasco, et al. Notice of Allowance dated May 16, 2013, U.S. Appl. No. 11/523,950; All Pages.
Van Dyke, et al. Notice of Allowance dated May 8, 2013, U.S. Appl. No. 11/592,819; All Pages.
Yuan, et al. Notice of Allowance dated Apr. 30, 2013, U.S. Appl. No. 11/591,856; All Pages.

* cited by examiner

TECHNIQUES FOR SERVICING FETCH REQUESTS UTILIZING COALESING PAGE TABLE ENTRIES

CROSS-REFERENCE TO RELATED APPLICATIONS

This is a continuation-in-part of U.S. patent application Ser. No. 11/523,950 filed Sep. 19, 2006, which is incorporated herein by reference.

BACKGROUND OF THE INVENTION

Instructions and data used by a computing device are stored at physical addresses in one or more primary or secondary memory devices. Primary memory device, such as system memory, graphics memory and the like, is characterized by quick access times but stores a limited amount of data. Secondary memory devices, such as magnetic disk drives, optical disk drives and the like, can store large amounts of data, but have relatively longer access times as compared to the primary memory devices.

Generally, instructions and data are stored in pages in the one or more secondary memory devices. As pages are needed by a given application, they can be moved into one or more primary memory devices. Pages that are no longer needed by the application can be moved from the primary memory device back to the secondary memory device to make room for other pages that are needed by a given application. When pages are moved from secondary to primary memory or moved from primary memory back to secondary memory, their physical addresses change. However, it is undesirable and inefficient for applications running on a computing device to keep track of these changing physical addresses.

Accordingly, the applications utilize virtual addressing to access instructions and data. Virtual addressing provides a separation between the physical memory and the virtual addresses that an application utilized to load or store data and instructions. Processes running inside a virtual memory space do not have to move data between physical memory devices, and do not have to allocate or reallocate portion of the fixed amount of system level memory between them. Instead, a memory management unit (MMU) and/or the operating system (OS) keeps track of the physical location of each piece of data, and moves data between physical locations to improve performance and/or ensure reliability.

Referring to FIG. 1, an exemplary address translation data structure utilized to translate virtual addresses 110 to physical addresses 120 is illustrated. The address translation data structure may include a page table data structure 130 and a translation lookaside buffer (TLB) 140. The page table data structure 130 may include a page directory 150 and one or more page tables 160-190. The page directory 150 includes a plurality of page directory entries (PDE). Each PDE includes the address of a corresponding page table 160-190. Each PDE may also include one or more parameters that are utilized to translate the virtual address to a physical address and access the physical memory device. Each page table 160-190 includes one or more page table entries (PTE). Each PTE includes a corresponding physical address of data and/or instructions in primary or secondary memory. Each PTE may also include one or more parameters that are utilized to translate the virtual address to a physical address and access the physical memory device.

Upon receiving a virtual address, the TLB 140 is accessed to determine if a mapping between the virtual address 110 and the physical address 120 has been cached. If a valid mapping has been cached (e.g., TLB hit), the physical address 120 is output from the TLB 140. If a valid mapping is not cached in the TLB, the page table data structure is walked to translate the virtual address 110 to a physical address 120. More specifically, the virtual address 110 may include a page director index, a page table index, and a byte index. The page directory index in the virtual address 110 is used to index the page directory 150 to obtain the address of an appropriate page table 170. The page table index in the virtual address 110 is used to index the appropriate page table specified in the given PDE to obtain the physical address 120 of the page containing the data. The byte index in the virtual address 110 is then used to index the physical page to access the actual data. The resulting mapping is then typically cached in the TLB 140 for use in translating subsequent memory access requests. Furthermore, as a page moves from secondary memory to primary memory or from primary memory back to secondary memory, the corresponding PTE in the page table data structure 130 and TLB 140 is updated.

Generally, the PTE can also store additional attributes associated with memory accesses. An exemplary page table 140 that stores a plurality of PTEs is shown in FIG. 2. Each PTE in the page table 140 includes a page frame address 120 and one or more attributes 220. The attributes 220 may include a dirty bit, an accessed bit, a page check disable bit, page write transparent bit, a user accessible bit, a writeable bit, a present bit, a hash function identification bit, a valid bit, an address compare bit, a referenced bit, a changed bit, storage control bits, a no execute bit, page protection bits and/or the like. The attributes 220 can be used by the MMU and/or OS to manage the data in the primary and secondary memories and access thereto.

Referring now to FIG. 3, an exemplary memory subsystem according to the conventional art is shown. The memory subsystem includes a memory management unit 305 communicatively coupled to a computing device readable medium (e.g., primary memory), such as random access memory (RAM) 310. The memory 310 is adapted to store at least a portion of one or more address translation data structures 315, and data and instructions 320. In one implementation, the address translation data structure includes a page directory and one or more page tables 325 A given page table 325 may include a plurality (X) of PTEs.

The memory management unit 305 includes a paging module 320 and a cache 335. The paging module 330 is adapted to manage caching of page table entries 325' and translation of virtual address to physical addresses. In particular the paging module 330 caches one or more address translation mappings to service memory access requests. Each mapping includes a previously utilized page table entry and is stored as part of a translation lookaside buffer (TLB) 325'. Because the cache 335 in the memory management unit 305 is relatively small, the paging module 330 swaps mappings in an out of the cache 335 in accordance any conventional replacement algorithm. Accordingly, there are various tradeoffs between the size of the cache 335, latency resulting from having to swap page table entries between the cache 335 and memory 310, and communication traffic generated between the cache 335 and the memory 310.

SUMMARY OF THE INVENTION

Each page in a virtual memory space may be mapped to a page in a physical address space. Furthermore, there may be cases when a plurality of contiguous virtual pages are mapped to a plurality of contiguous physical pages. Accordingly, embodiments of the present invention are direct toward memory access techniques including coalesced mappings between contiguous pages. In one embodiment, a method of accessing memory includes determining if a fetched page table entry (PTE) is a coalesced PTE. If it is a coalesced PTE, it is determined if the PTE can service one or more other fetch requests pending in a queue. If the coalesced PTE can service one or more other fetch requests, the appropriate fetch requests are redirected to the coalesced PTE.

In another embodiment, a method of accessing memory includes receiving one or more memory access requests. A PTE fetch request is generated for each given memory access request if valid coalesced or non-coalesced PTE for the given memory access request is not cached in a translation lookaside buffer. Information about the fetch requests are sorted into a queue. For each page table entry that is fetched, it is determined if the PTE is a coalesced or non coalesced PTE. If it is a coalesced PTE, a physical address is calculated utilizing the virtual address in the corresponding memory access request and the coalesced PTE. In addition, if the PTE is a coalesced PTE, one or more other fetch requests pending in the queue can be serviced utilizing the coalesced PTE.

In yet another embodiment, a computing device includes memory and a memory management unit. The memory is adapted to store an address translation data structure used to translate virtual addresses to physical addresses. The memory management unit includes a cache and a paging unit. The cache is adapted to store some or all of the mappings of the address translation data structure. The paging unit is adapted to determine if a given PTE fetched from the address translation data structure is a coalesced or non-coalesced PTE. If the fetched PTE is a coalesced PTE, the paging unit is adapted to service a given pending fetch request utilizing the coalesced PTE and to redirect other pending fetch requests to the coalesced PTE.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
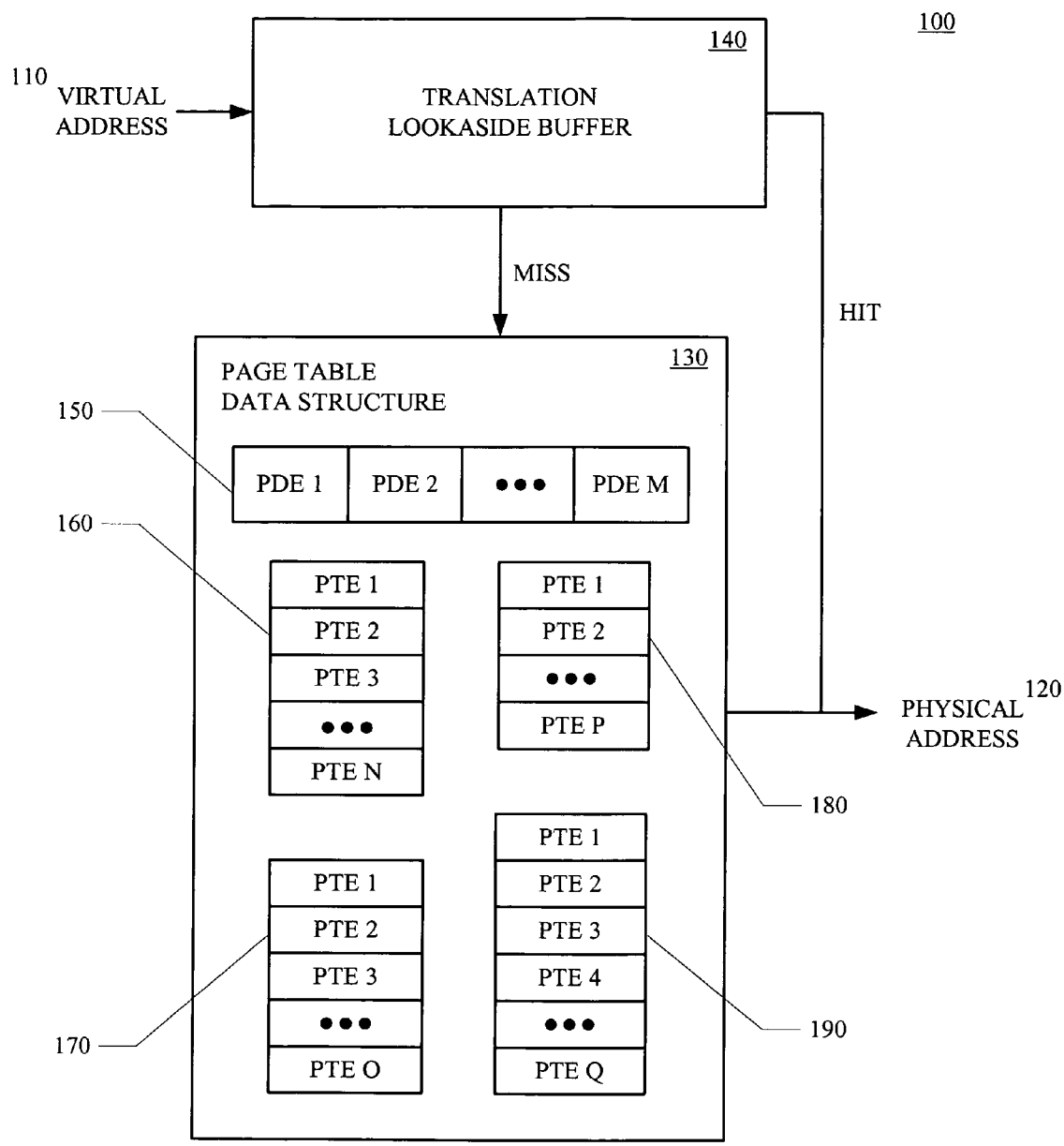
FIG. 1 shows a block diagram of an exemplary address translation data structure according to the conventional art.
Figure 2:
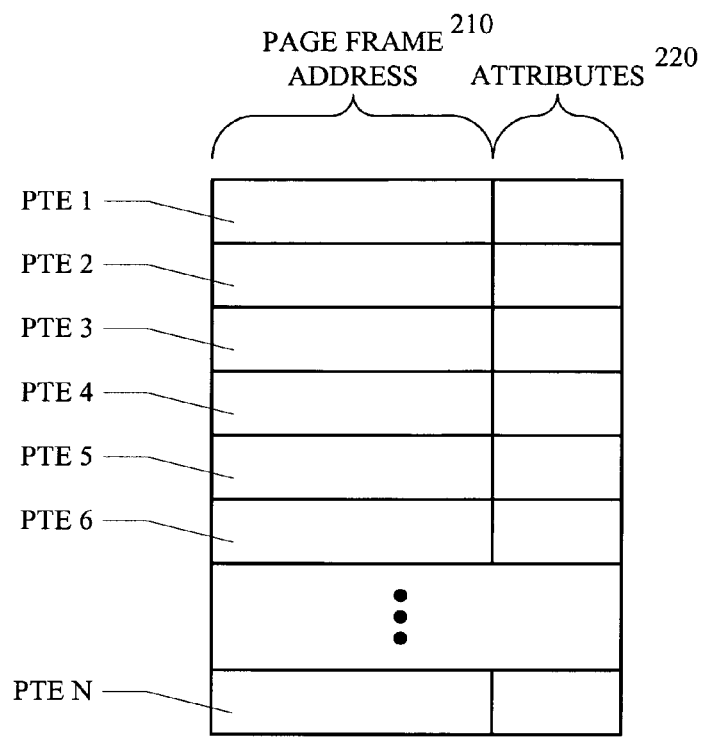
FIG. 2 shows a block diagram of an exemplary page table according to the conventional art.
Figure 3:
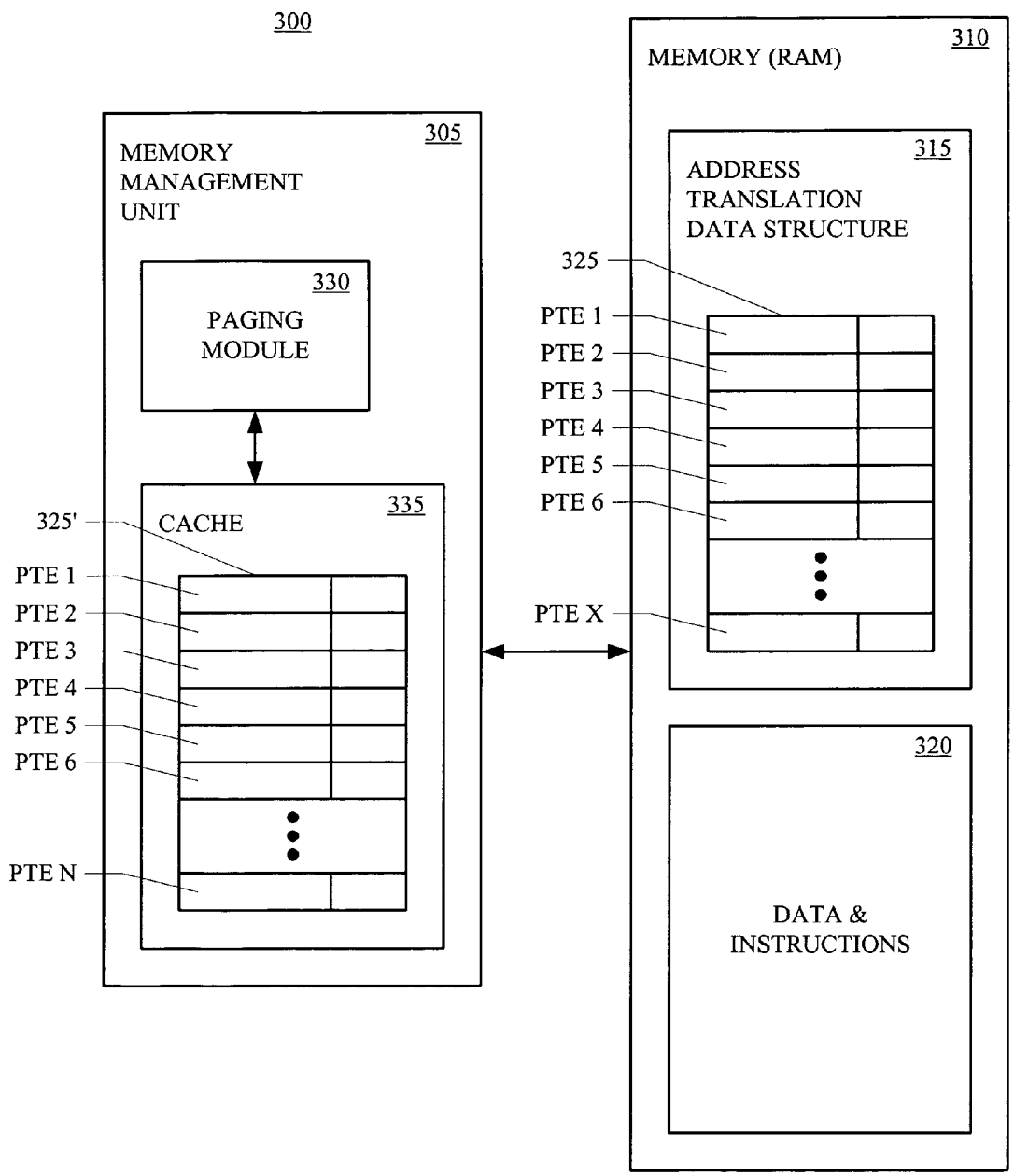
FIG. 3 shows a block diagram of an exemplary memory subsystem according to the conventional art.
Figure 4:
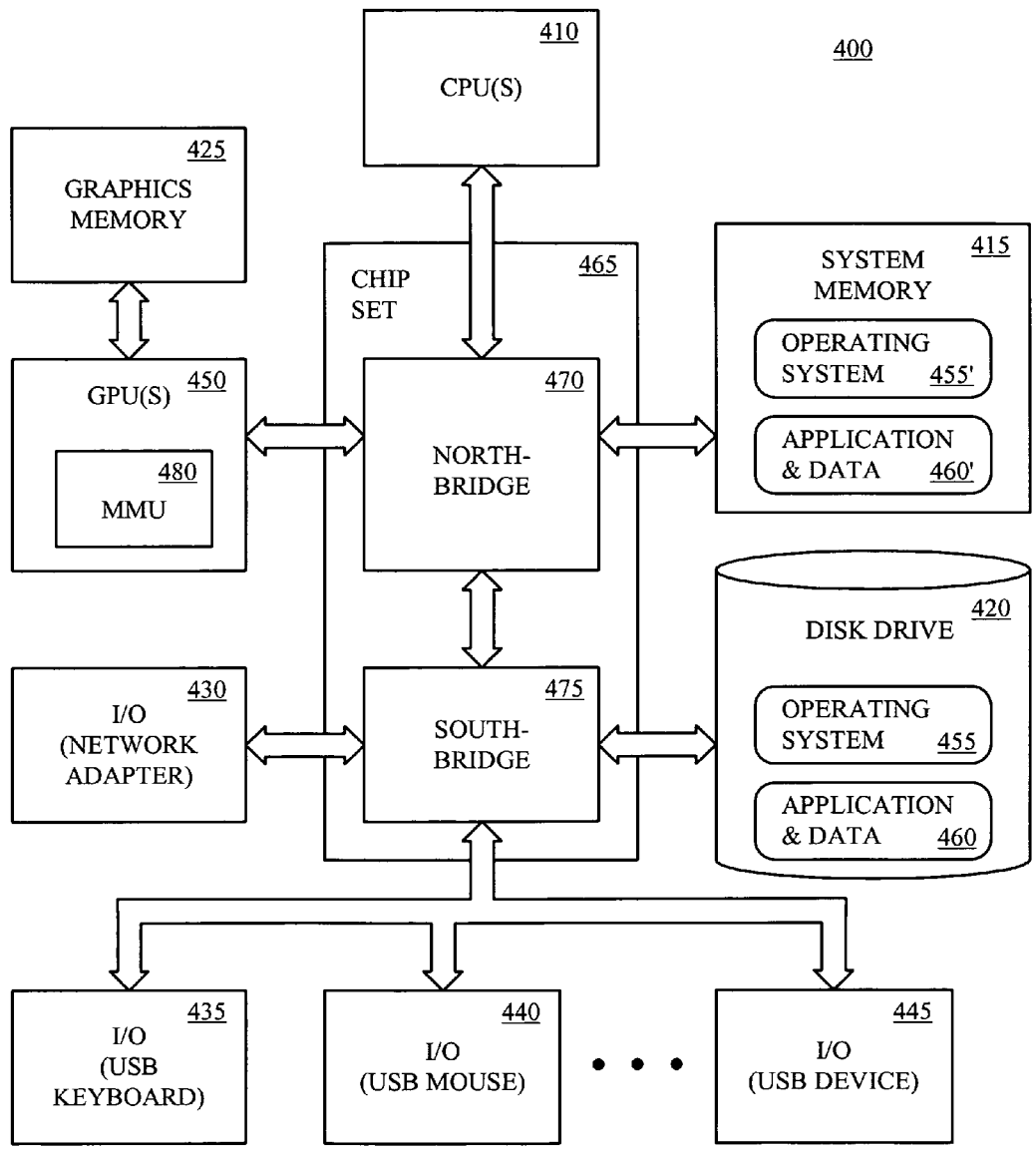
FIG. 4 shows a block diagram of an exemplary computing device for implementing embodiments of the present invention.

Referring to FIG. 4, an exemplary computing device 400 for implementing embodiments of the present invention is shown. The computing device 400 may be a personal computer, server computer, client computer, laptop computer, hand-held device, minicomputer, mainframe computer, distributed computer system or the like. The computing device 400 includes one or more processors (e.g., CPU) 410, one or more computing device-readable media 415, 420, 425 and one or more input/output (I/O) devices 420, 430, 435, 440, 445. The I/O device 430, 435, 440, 445 may include a network adapter (e.g., Ethernet card), CD drive, DVD drive and/or the like, and peripherals such as a keyboard, a pointing device, a speaker, a printer, and/or the like. The computing device 400 may also include one or more specialized processors, such as a graphics processing unit (GPU) 450.

The computing device-readable media 415, 420, 425 may be characterized as primary memory and secondary memory. Generally, the secondary memory, such as a magnetic and/or optical storage, provides for non-volatile storage of computer-readable instructions and data for use by the computing device 400. For instance, the disk drive 420 may store the operating system (OS) 455 and applications and data 460. The primary memory, such as the system memory 415 and/or graphics memory 425, provides for volatile storage of computer-readable instructions and data for use by the computing device 400. For instance, the system memory 415 may temporarily store a portion of the operating system 455' and a portion of one or more applications and associated data 460' that are currently used by the CPU 410, GPU 450 and the like.

The computing device-readable media 415, 420, 425, I/O devices 420, 430, 435, 440, 445, and GPU 450 may be communicatively coupled to the processor 410 by a chip set 465 and one or more busses. The chipset 465 acts as a simple input/output hub for communicating data and instructions between the processor 410 and the computing device-readable media 415, 420, 425, I/O devices 420, 430, 435, 440, 445, and GPU 450. In one implementation, the chipset 465 includes a northbridge 470 and southbridge 475. The northbridge 470 provides for communication with the processor 410 and interaction with the system memory 415. The southbridge 475 provides for input/output function.

The graphics processing unit 450 may include a memory management unit (MMU) 480 for managing the transfer of data and instructions. However, in other embodiments the MMU 480 may be independent circuit, a part of the chip set 465, a part of the primary or secondary memory, or other component in the computing device.

The MMU 480 translates virtual address to physical addresses. In one implementation, the virtual address space is divided into pages of size $2^N$ bytes. The pages may be from 2 kilobytes to 512 megabytes or more, and are typically 4 kilobytes to 64 kilobytes in size. In such cases, the MMU 480 translates virtual page numbers to physical page numbers utilizing an address translation data structure.

The MMU 460 and/or OS 455 also creates and manages the address translation data structure. In addition to the conventional management, the MMU 460 and/or OS 455 also may coalesce mappings between virtual memory and physical memory that are stored in the address translation data structure, when a contiguous plurality of virtual pages map to a contiguous plurality of physical pages. Thus, if they are both consecutive in virtual and physical space, than can be coalesced so that only one PTE in the MMU 460 cache is needed to represent all of the pages. In the page table, the PTEs corresponding to these pages are all identical. The MMU 460 may then use any of the coalesced mappings to translate virtual address to physical addresses for the corresponding contiguous memory spaces.

In a MMU 460 that supports miss-under-miss, the various misses may be grouped into different queues that represent different pages. Each of these pages has a PTE fetch outstanding. If two or more pages, which have been grouped into a queue, turn out to be coalesced together, the misses in the given queue can be serviced right away utilizing the coalesced PTE fetched for the first page in the queue. Thus, the other pages in the queue that are still waiting for their respective PTE fetches can be serviced by the PTE fetch of a previous page in the queue. The queues with outstanding PTE fetches are redirected to the page that already has its PTE fetched.

Figure 5:
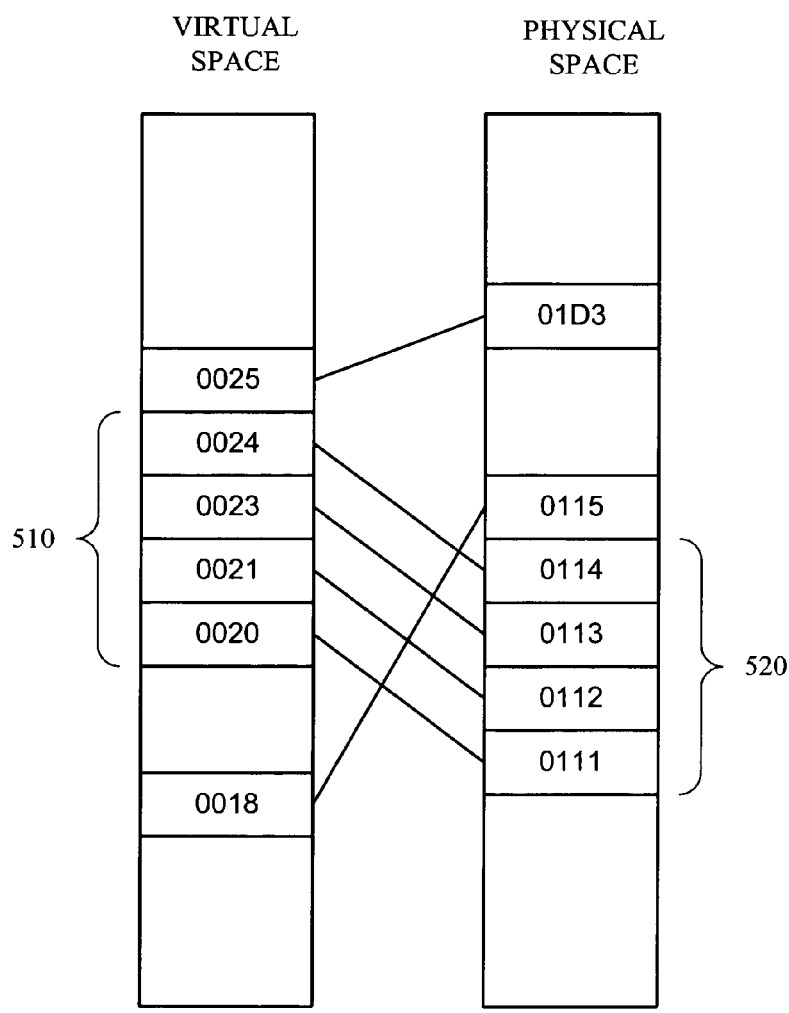
FIG. 5 shows a block diagram illustrating a mapping between a virtual address space and a physical address space.

Referring now to FIG. 5, an illustration of a mapping between a virtual address space and a physical address space, is shown. As depicted, each page in the virtual memory space may be mapped to a page in the physical address space. There may be cases during operation of the computing device 400 when a plurality of contiguous virtual pages 510 are mapped to a plurality of contiguous physical pages 520. If a plurality of contiguous virtual pages 510 are mapped to a plurality of contiguous physical pages 520, entries in an address translation data structure (e.g., page table data structure and/or TLB) may be coalesced.

Figure 6:
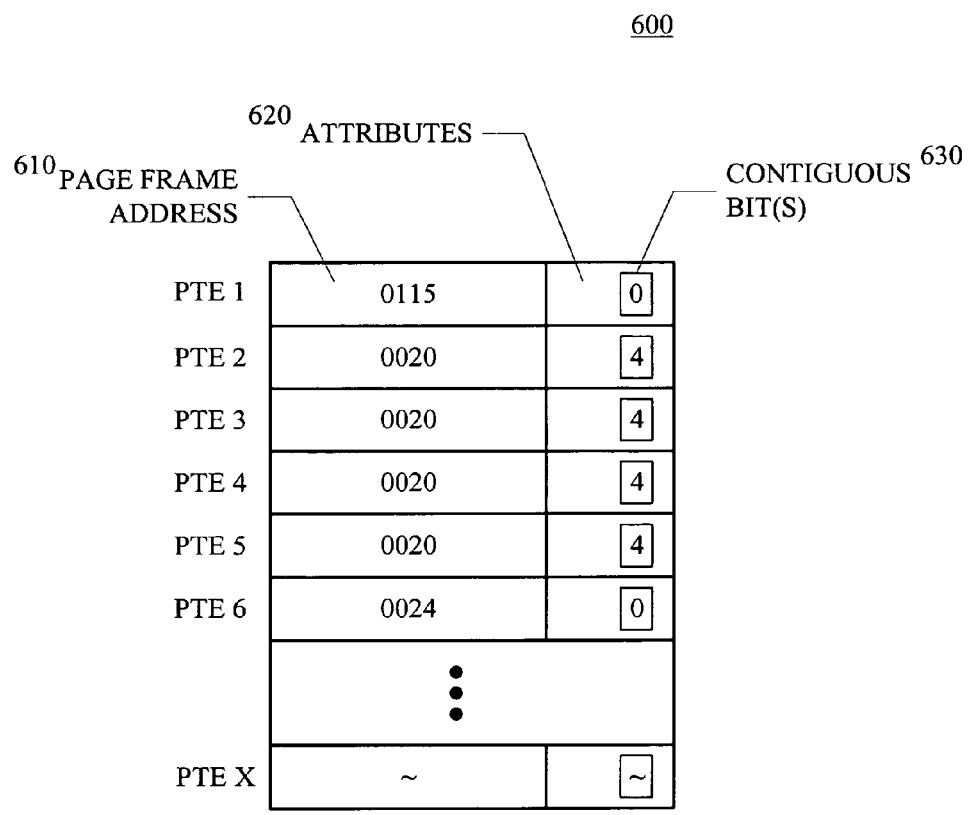
FIG. 6 shows a block diagram of an exemplary page table, in accordance with one embodiment of the present invention.

Referring now to FIG. 6 in combination with FIG. 5, an exemplary page table, in accordance with one embodiment of the present invention, is shown. Each PTE in the page table 600 includes a page frame address 610 and one or more attributes 620. The attributes 620 may include one or more contiguous bits 630, a dirty bit, an accessed bit, a page check disable bit, page write transparent bit, a user accessible bit, a writeable bit, a present bit, a hash function identification bit, a valid bit, an address compare bit, a referenced bit, a changed bit, storage control bits, a no execute bit, page protection bits and/or the like. If a plurality of contiguous virtual pages 510 are mapped to a plurality of contiguous physical pages 520, the frame address 610 of each corresponding PTE (e.g., PTE 2, PTE 3, PTE 4, PTE 5) may be the physical page number of the base physical page number (e.g., lowest address—0020) and the contiguous bits 630 are set to the number of contiguous pages (e.g., 4).

In one implementation, the contiguous bits directly specify the number of contiguous pages. For example, if there are three bits for specifying the number of contiguous pages and the bits are set to a value of "2," then the contiguous bits indicate that there are two contiguous virtual pages mapped to two contiguous physical pages. Alternatively, a bit value of "0" may indicate that the page is not contiguous with another page, a bit value of "1" may indicate that there are two contiguous pages and a bit value of "2" may indicate that there are three contiguous pages. In another implementation, the contiguous bits specify a power-of-two number of pages. For example, if there are three bits for specifying the number of contiguous pages and the bits are set to a value of "2," then the contiguous bits indicate that there are four (e.g., $2^2$) contiguous virtual pages mapped to four contiguous physical pages. Alternatively, a bit value of "N" may indicate that there are $2^N+1$ contiguous pages. In another implementation, the contiguous bits include a first bit that indicates whether the remaining contiguous bits directly specify the number of contiguous pages or if the contiguous bits specify a power-of-two number of pages.

Figure 7:
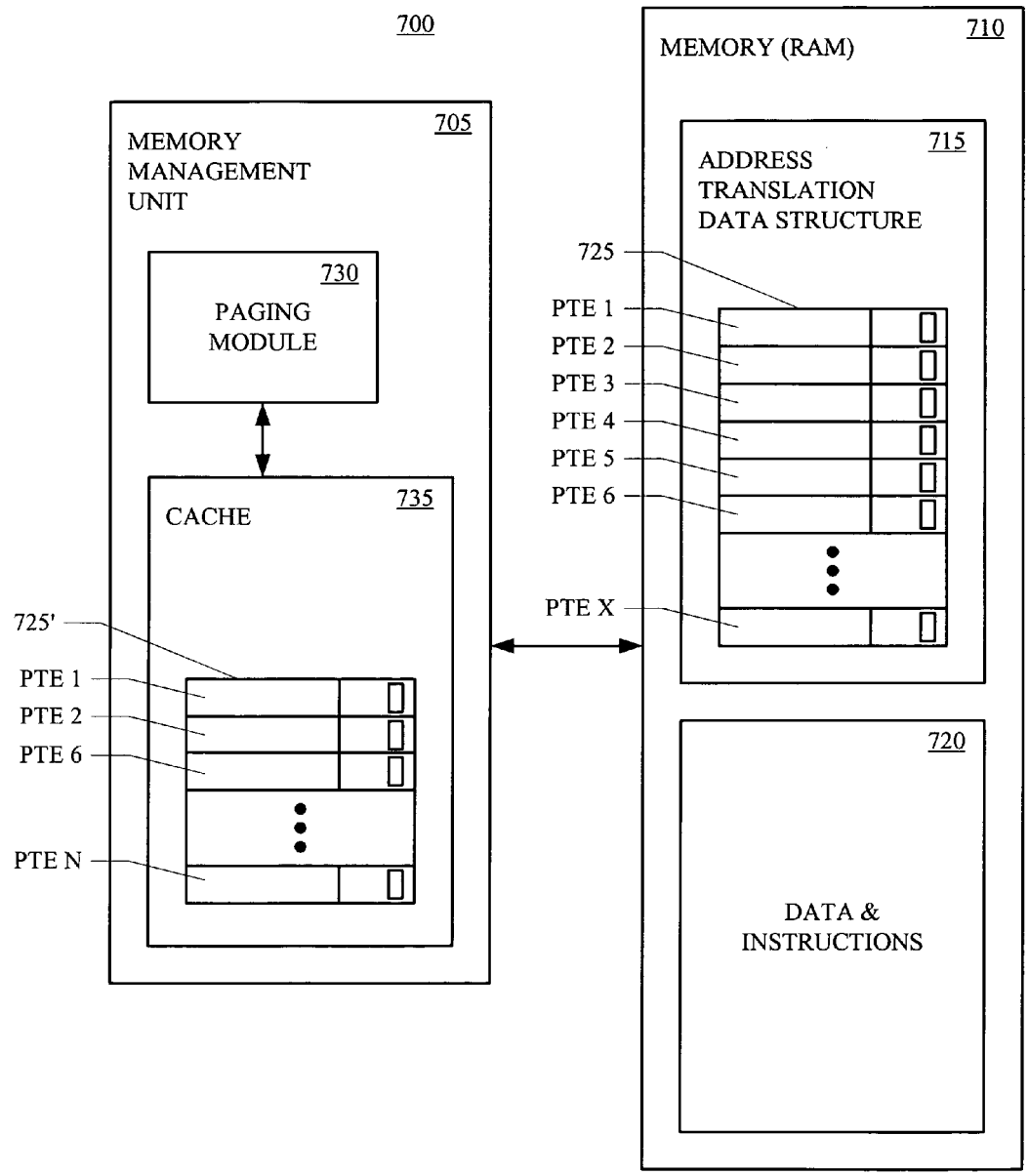
FIG. 7 shows a block diagram of a memory access subsystem, in accordance with one embodiment of the present invention.

Referring now to FIG. 7, a memory access subsystem, in accordance with one embodiment of the present invention, is shown. The memory subsystem 700 includes a memory management unit (MMU) 705 communicatively coupled to a computing device readable medium (e.g., primary memory), such as random access memory (RAM) 710. In one implementation, the computing device-readable medium 710 may be system memory 415. In another implementation, the computing device-readable medium 710 may be graphics memory 425. The memory 710 is adapted to store at least a portion of one or more address translation data structures 715, and data and instructions 720. A given page table 725 of the address translation data structure 715 stored in the memory 710 may include a plurality of PTEs.

In one implementation, the MMU 705 may be an integral part of a graphics processor 450 or chip set 465. In other implementations, the MMU 705 may be an independent circuit, a part of the primary or secondary memory, or the like. The memory management unit 705 includes a paging module 730 and a cache 735. The paging module 730 is adapted to manage the caching of address translation mappings and translation of virtual address to physical addresses. In particular the paging module 730 caches one or more address translation mappings to service memory access requests. Each mapping includes a previously utilized page table entry and is stored in a translation lookaside buffer (TLB) 740. If the page table 725 and/or TLB 740 include coalesced PTEs, any PTE within the coalesced region will be sufficient to map all pages within the coalesced region. Accordingly, the paging module 730 loads one of the coalesced PTEs and not all of them into the TLB 740 in the cache 735. In one implementation, the paging module 730 loads the PTE for the base physical page number.

When translating the virtual address to a physical address, the paging module 730 determines whether the virtual address of the request matches a non-coalesced PTE in the TLB 740 or page table data structure 725, or the virtual address of the request falls into the virtual address region covered by a coalesced PTE in the TLB 740 or page table data structure 725. If the virtual address of the request has a valid coalesced or non-coalesced entry, the physical address can be generated from the given entry.

Figure 8:
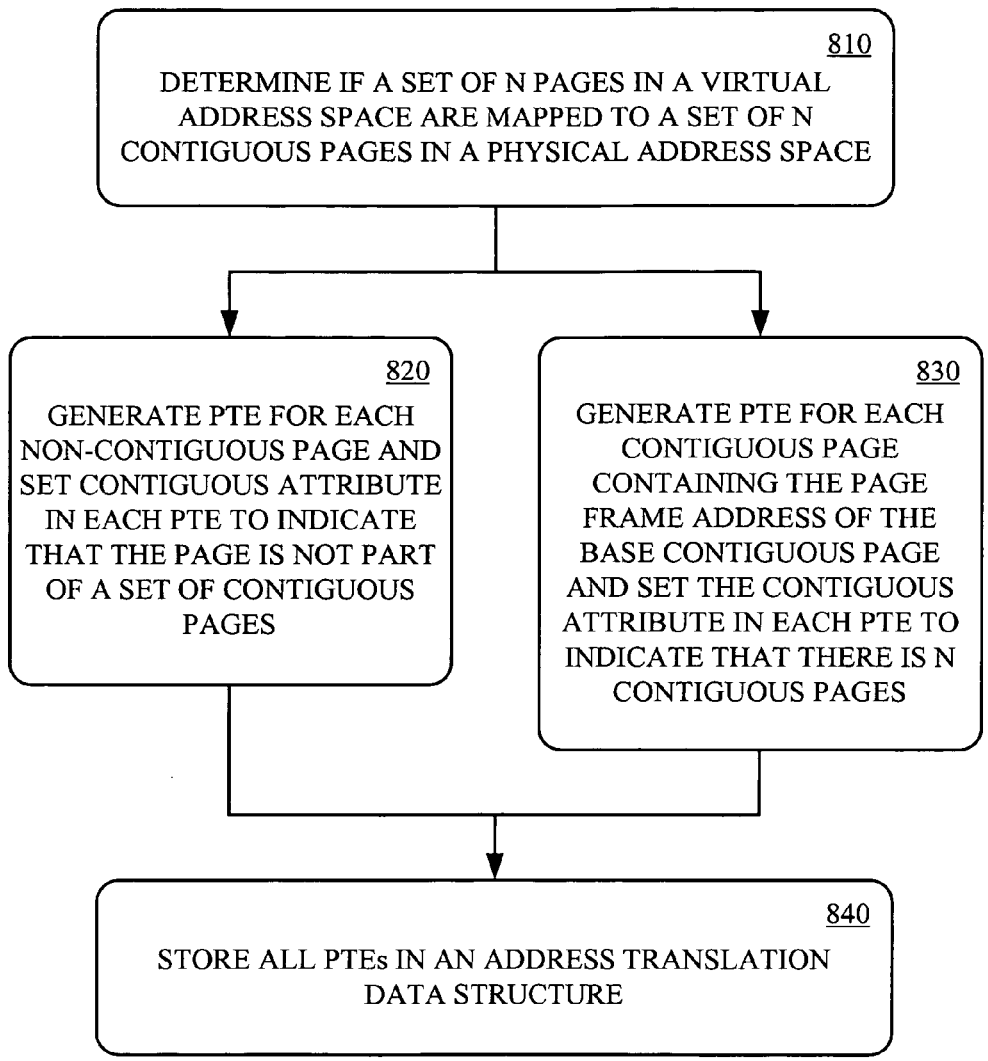
FIG. 8 shows a flow diagram of a method of generating a page table, in accordance with one embodiment of the present invention.

Referring now to FIG. 8, a method of generating an address translation data structure, in accordance with one embodiment of the present invention, is shown. The method 800 includes determining if a set of N contiguous pages in a virtual address space are mapped to a set of N contiguous pages in a physical address space, at 810. Pages that satisfy the condition that both the N virtual pages are contiguous and the N physical pages are contiguous are simply referred herein to as contiguous pages. At 820, a PTE is generated for each non-contiguous page and the contiguous attribute in the PTE is set accordingly. At 830, a PTE is generated for each of the N contiguous page and the contiguous attribute in each PTE is set to indicate that there are N contiguous pages. At 840, the generated PTEs are stored in an address translation data structure. In one implementation, the PTE are stored in a page table and or a translation lookaside buffer (TLB). Furthermore, in one implementation, the PTE are generated by the OS 455 of the computing device 400.

Figure 9:
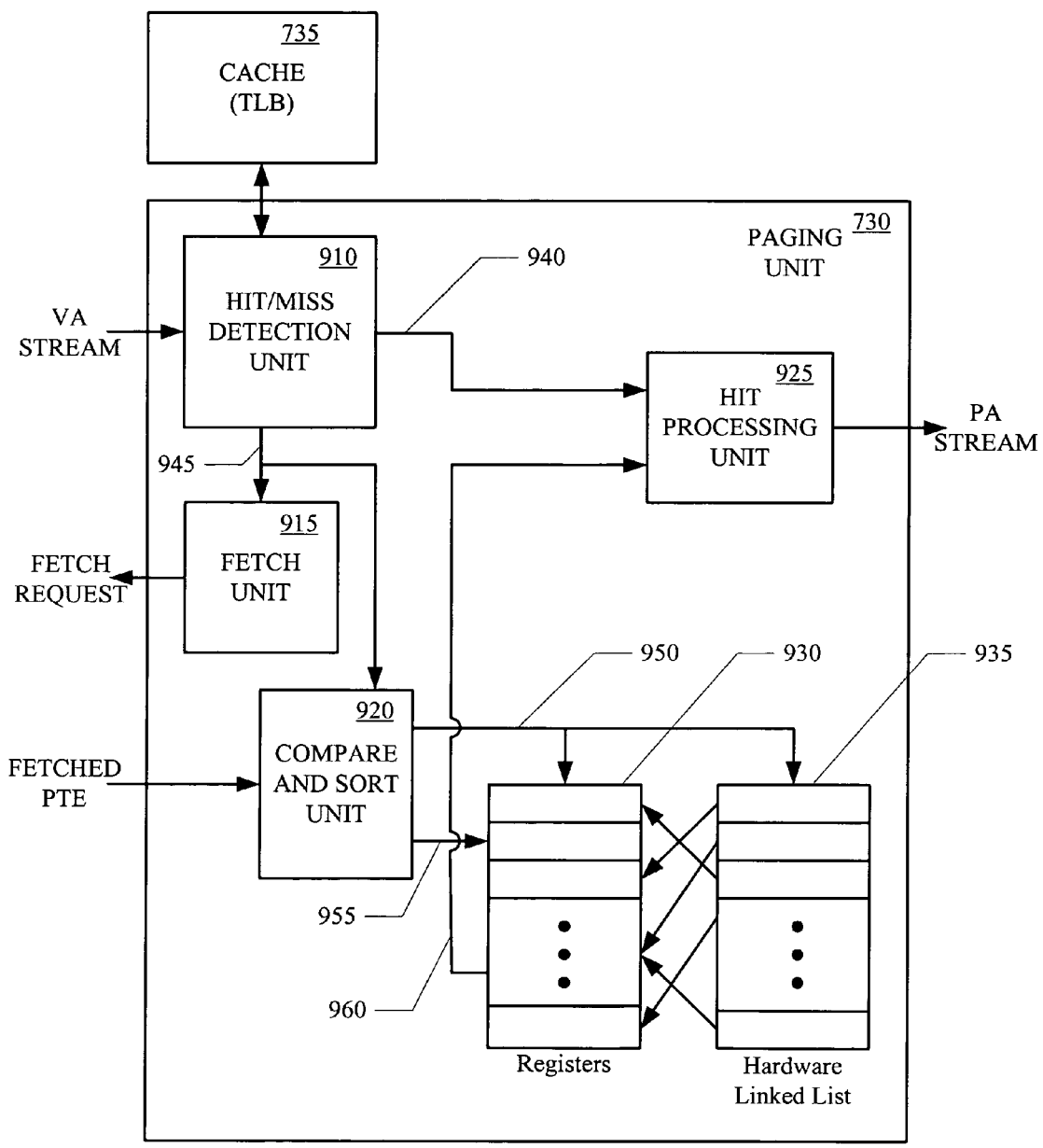
FIG. 9 shows a flow diagram of a method of translating a virtual address to a physical address, in accordance with one embodiment of the present invention.

Referring now to FIG. 9, the paging unit 730 and cache 735 of the MMU 705 from FIG. 7, is shown. The cache 735 includes the translation lookaside buffer. The paging unit 730, in accordance with one embodiment of the present invention, includes a hit/miss detection unit 910, a fetch unit 915, a compare and sort unit 920, a hit processing unit 925, a miss queue 930, and a miss RAM 935. The hit/miss detection unit 910 receives a virtual address stream. The hit/miss detection unit 910 determines if a TLB entry in the cache 735 is a hit for each virtual address that is receive. The TLB entry is a hit if it includes a valid PTE that is a match for a given virtual address. If a TLB hit is determined 940, the hit processing unit 925 outputs the physical address that the valid TLB entry maps to the given virtual address.

If the hit/miss detection unit 910 determines that there is no TLB entry that contains a valid mapping of the virtual address to a physical address, a TLB miss indication 945 is sent to the fetch unit 915 and the compare and sort unit 920. The fetch unit 915 generates a fetch request for the appropriate PTE stored in a page table data structure. The compare and sort unit 920 writes the TLB miss information 950 into the miss queue 930 and the miss RAM 935. In one implementation, the miss queue 930 is a plurality of registers and the miss RAM 935 is a hardware linked list. The misses are sorted per page in the miss queues 930 and threaded to the miss RAM 935 with a tag that indicates which bin in the queue the miss has been sorted into.

When a fetched PTE is received by the compare and/sort unit 920, the PTE is compared 955 to the entries in the miss queue 930. All of the fetch requests that can be serviced by the fetched PTE can be determined from the miss queue 930. If the PTE is a non-coalesced PTE the appropriate miss information is read out 960 to the hit processing unit 925. If the PTE is a coalesced PTE and it can service more than one fetch request, miss information for all of the requests that can be serviced are read out 960 to the hit processing unit 925. For example, if miss queue 930 and miss RAM 935 contains miss information for misses 0-10 and a PTE is fetched for miss 1 and it is a coalesced PTE that can also service miss 2 then the fetched PTE can be utilized to generate physical addresses for both misses without having to wait for the fetch request for miss 2 to be returned.

The hit processing unit 925 may then generate the physical address for each of the misses that can be translated using the PTE that has been fetched. For the case of coalesced PTE's the processing time for translating address will be reduced by approximately one half or more of the fetch time.

In one implementation, all entries in the miss queue 930 and miss RAM 935 that can be serviced by a given fetch request are removed when their miss information is read out. Therefore, when the subsequent fetch request comes in and a corresponding entry is not containing in the miss queue 930 then the fetched PTE is ignored. In another implementation, the fetch requests corresponding to the other misses that can be serviced by the results of a previous fetch request are canceled or dropped.

Figure 10:
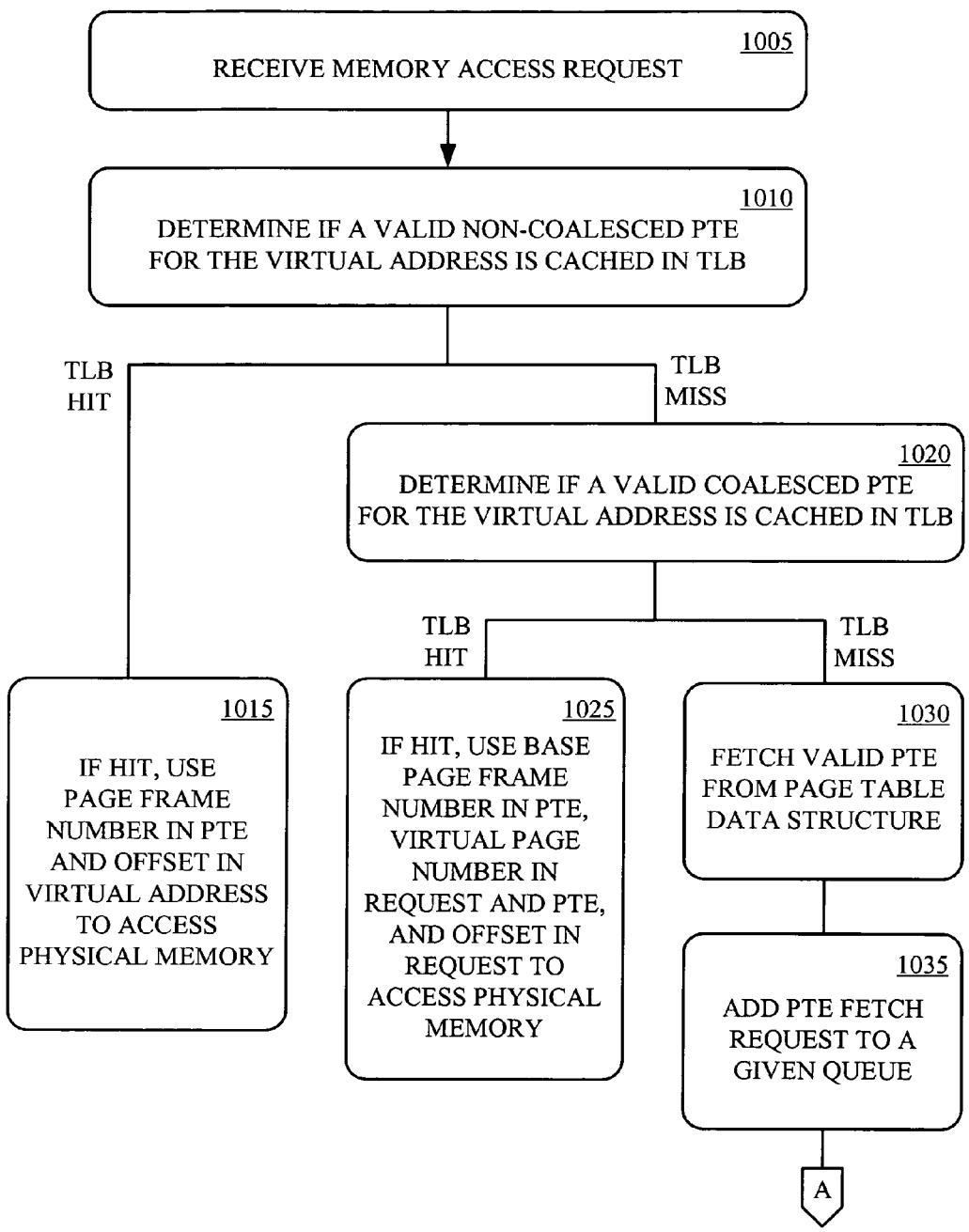
FIGS. 10 and 11 show a flow diagram of a method of translating a virtual address to a physical address, in accordance with one embodiment of the present invention.
Figure 11:
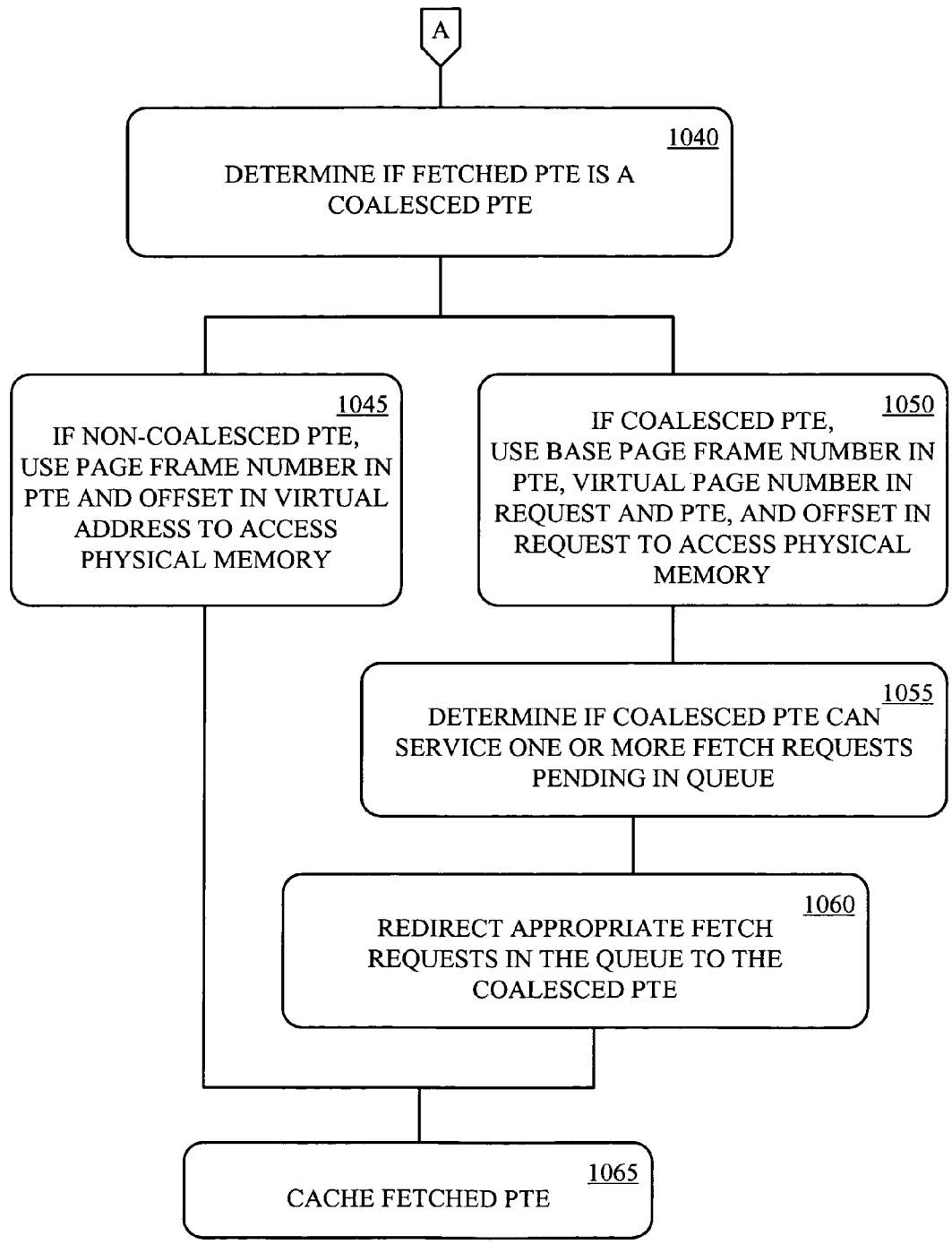

Referring now to FIGS. 10 and 11, a method of translating a virtual address to a physical address, in accordance with one embodiment of the present invention, is shown. In one implementation, the following method of translating a virtual address to a physical address may be performed by the memory management unit 480 of the computing device 400 in FIG. 4. As depicted in FIG. 10, the method includes receiving a memory access request, at 1005. At 1010, it is determined if a valid non-contiguous PTE is cached in a translation lookaside buffer (TLB) for the virtual address contained in the memory access request. At 1015, if there is a valid non-contiguous PTE cached for the virtual address (e.g., a TLB hit), the page frame number in the valid PTE and the byte offset contained in the virtual address are utilized to access the physical memory.

At 1020, it is determined if there is a valid coalesced PTE cached in the TLB for the virtual address. At 1025, if a hit for a coalesced PTE is determined then the physical address of the page mapped to the virtual address of the memory access request is calculated based on a base physical address (e.g., base page frame number) in the coalesced PTE, the virtual page number in the coalesced PTE, the virtual page number in the request and the offset portion of the virtual address in the request.

At 1030, if a miss for both a valid PTE and a contiguous PTE is determined, then a PTE fetch request is issued. The fetch request is added into a queue of pending fetch request, at 1035. In one implementation, the fetch requests are sorted into bins within the queue.

At 1040, for each PTE received from the page table data structure, it is determined whether the fetched PTE is a non-coalesced PTE or a coalesced PTE. If the PTE is a non-coalesced PTE, then the page frame number in the valid PTE and the byte offset contained in the virtual address are utilized to access the physical memory, at 1045.

If the PTE is a coalesced PTE, then the physical address of the page mapped to the virtual address of the memory access request is calculated based on a base physical address (e.g., base page frame number) in the coalesced PTE, the virtual page number in the coalesced PTE, the virtual page number in the request and the offset portion of the virtual address in the request, at 1050. In addition, at 1055, it is determined if the coalesced PTE can service one or more fetch requests pending in the queue. If the coalesced PTE can service one or more fetch request, the appropriate fetch request are redirect to the coalesced PTE, at 1060. The fetched PTE may then be cached in the TLB for reference in subsequent memory access request, at 1065.

Accordingly, embodiments of the present invention advantageously reduce the number of PTEs cached to service memory access requests when there are a plurality of contiguous virtual pages mapped to a plurality of contiguous physical pages. The technique also may reduce the access latency associated with page misses by utilizing the PTE of a coalesced page to service fetch requests for one or more of the other contiguous virtual pages to physical pages.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of accessing memory comprising:
   determining if a fetched page table entry is a coalesced page table entry from a contiguous attribute of the fetched page table entry, wherein;
   a first bit of the contiguous attribute specifies a type of encoding;
   a plurality of other bits of the contiguous attribute specifies an actual number of contiguous pages when the first bit is set to a first state;
   the plurality of other bits of the contiguous attribute specifies a power of two representation of the number of contiguous pages when the first bit is set to a second state;
   determining if the coalesced page table entry can service one or more fetch requests pending in a queue; and
   redirecting the one or more appropriate fetch requests in the queue to the coalesced page table entry if the coalesced page table entry can service the fetch requests.

2. The method according to claim 1, further comprising accessing physical memory utilizing a base page frame number in the fetched coalesced page table entry, a virtual page number of a given memory access request, the virtual page number in the fetched coalesced page table entry and an offset in the given memory access request.

3. The method according to claim 2, further comprising accessing the physical memory utilizing a page frame number in the fetched page table entry and an offset in the given memory access request if the fetched page table entry is non-coalesced page table entry.

4. The method according to claim 3, further comprising:
   receiving a memory access request;
   determining if a valid non-coalesced page table entry for the virtual address is cached in a translation lookaside buffer;
   accessing the physical memory utilizing a page frame number in the cached page table entry and an offset in the memory access request if a valid non-coalesced page table entry for the virtual address is cached in a translation lookaside buffer;
   determining if a valid coalesced page table entry for the virtual address is cached in the translation lookaside buffer; and
   accessing the physical memory utilizing a base page frame number in the valid coalesced page table entry, the virtual page number of the memory access request, the virtual page number in the valid coalesced page table entry and an offset in the memory access request if the valid coalesced page table entry is cached in the translation lookaside buffer
   adding a page table entry fetch request to a queue if neither a valid non-coalesced nor a valid coalesced page table entry are not cached in the translation lookaside buffer;
   fetching the valid page table entry from a page table data structure if neither the valid non-coalesced nor the valid coalesced page table entry are not cached in the translation lookaside buffer.

5. The method according to claim 1, further comprising:
   determining if a plurality of contiguous pages in a virtual address space are mapped to a plurality of contiguous pages in a physical address space;
   generating a mapping between a virtual address and a corresponding physical address for each non-contiguous page and setting the contiguous attribute in the mapping to indicate that the mapping is not part of a set of contiguous pages; and
   generating a mapping for each contiguous virtual address and a corresponding contiguous physical address containing a page frame address of a given contiguous page and setting the contiguous attribute in the mapping to indicate that there are a plurality of contiguous pages.

6. The method according to claim 5, further comprising caching each mapping as a page table entry in a page table.

7. The method according to claim 6, further comprising caching one or more of the page table entries in a translation lookaside buffer.

8. A method of accessing memory comprising:
   receiving one or more memory access requests;
   generating a fetch request for a given page table entry if a valid non-coalesced or a valid coalesced page table entry for each given memory access request not cached in the translation lookaside buffer;
   sorting information about the fetch requests into a queue;
   determining if a fetched page table entry is a coalesced page table entry or a non-coalesced page table entry from a contiguous attribute of the fetched page table entry, wherein;
   a first bit of the contiguous attribute specifies a type of encoding;
   a plurality of other bits of the contiguous attribute specifies an actual number of contiguous pages when the first bit is set to a first state;
   the plurality of other bits of the contiguous attribute specifies a power of two representation of the number of contiguous pages when the first bit is set to a second state;
   calculating a physical address for a given memory access request utilizing the fetched page table entry; and
   servicing appropriate fetch requests pending in the queue utilizing the fetched coalesced page table entry, if the fetched coalesced page table entry can service one or more other fetch requests.

9. The method according to claim 8, further comprising:
   determining if a valid page table entry is cached in a translation lookaside buffer; and
   calculating the physical address for the given memory access request utilizing the cached page table entry.

10. The method according to claim 9, further comprising accessing a computing device-readable medium at the physical address.

11. The method according to claim 8, wherein the fetch requests are sorted in the queue per page.

12. A computing device comprising:
   a first computing device-readable medium to store an address translation data structure;
   a memory management unit, communicatively coupled to the first computing device-readable medium, including;
   a second computing device-readable medium to cache one or more page table entries and one or more pending page table entry fetch requests; and
   a paging unit to determine if a given page table entry fetched from the first computing device-readable medium is a coalesced page table entry or a non-coalesced page table entry, to service a given pending page table entry fetch request utilizing the coalesced page table entry and to redirect another pending page table entry fetch request to the coalesced page table entry, wherein a first bit of a contiguous attribute in the given page table entry specifies a type of encoding, a plurality of other bits of the contiguous attribute specifies an actual number of contiguous pages when the first bit is set to a first state and the plurality of other bits of the contiguous attribute specifies a power of two representation of the number of contiguous pages when the first bit is set to a second state.

13. The computing device of claim 12, wherein the page unit is further adapted to determine if a valid coalesced page table entry or a valid non-coalesced page table entry is cached in the second computing device-readable medium and to translate each given virtual address to a given physical address utilizing a given cached page table entry.

14. The computing device of claim 12, wherein the first computing device-readable medium comprises a system memory.

15. The computing device of claim 12, wherein the first computing device-readable medium comprises a graphics memory.

16. The computing device of claim 12, wherein the memory management unit:
- caches the one or more page table entries in a translation lookaside buffer; and
- stores the one or more page table entry fetch requests in a queue.

17. The computing device of claim 16, wherein the queue comprises a plurality of registers and a hardware linked list.

18. The computing device of claim 16, wherein the one or more page table entry fetch requests are sorted in the queue per page.

\* \* \* \* \*